Figure 1:
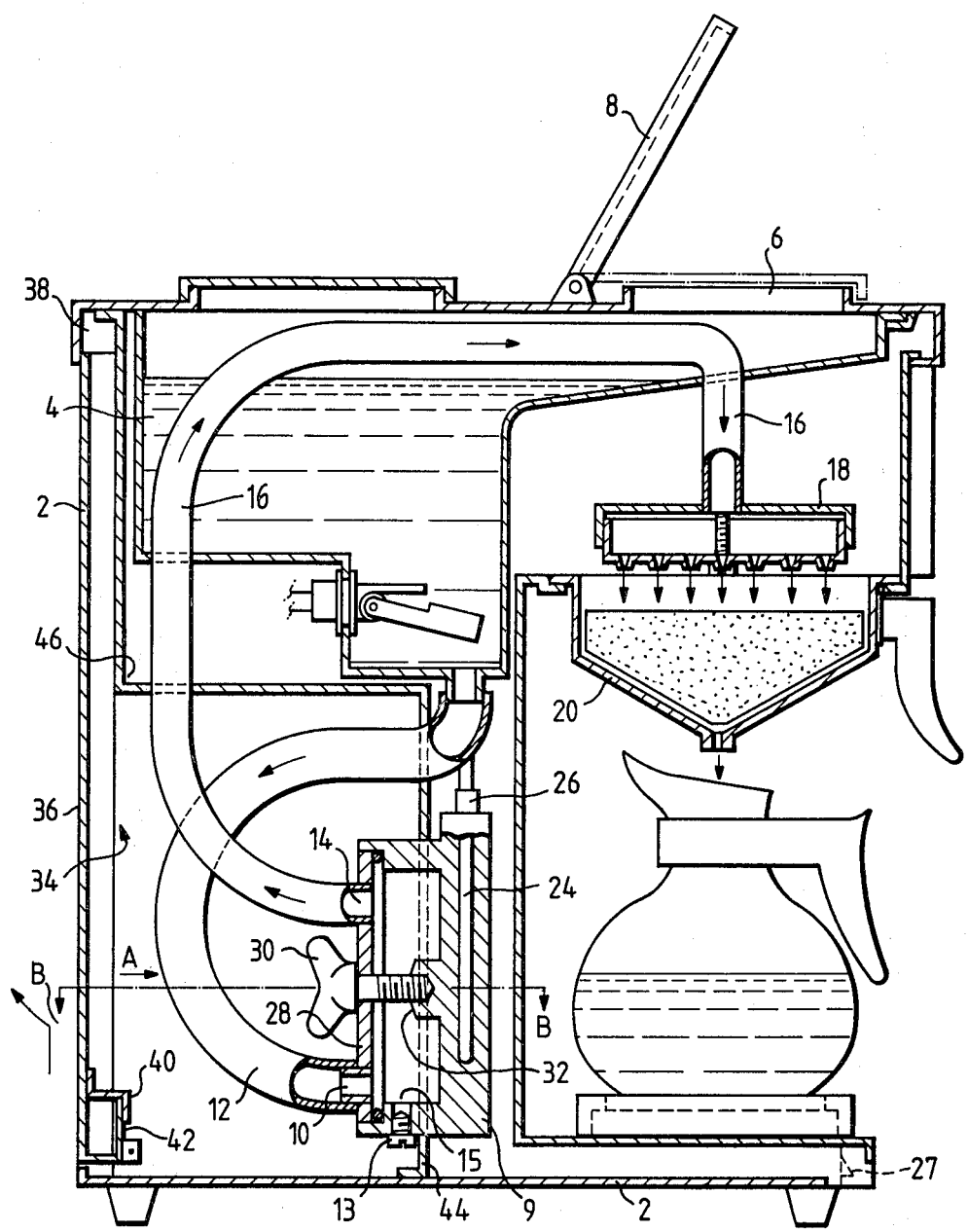

United States Patent [19]

Phillips et al.

[11] 4,426,920
[45] Jan. 24, 1984

[54] COFFEE AND TEA MAKING OR BREWING APPARATUS

[75] Inventors: M. K. Phillips, St. Leonards-on-Sea, now by change of name from Maciej Karol Filipowicz; Cecil Hayes, Hastings, both of England

[73] Assignee: W. M. Still & Sons Limited, Sussex, England

[21] Appl. No.: 423,024

[22] Filed: Sep. 24, 1982

[30] Foreign Application Priority Data

Oct. 5, 1981 [GB] United Kingdom ............... 8130052

[51] Int. Cl.³ .............................................. A47J 31/10
[52] U.S. Cl. ...................................... 99/307; 219/305
[58] Field of Search ................ 99/281, 282, 283, 295, 99/307, 279, 288, 300; 219/302, 305, 283, 296, 297

[56] References Cited

U.S. PATENT DOCUMENTS

| | | | |
|---|---|---|---|
| 1,480,174 | 1/1924 | Matthews | 219/305 |
| 1,847,489 | 3/1932 | Lonergan | 219/305 |
| 4,188,864 | 2/1980 | Fischer | 219/283 |
| 4,354,427 | 10/1982 | Filipowicz | 99/307 |

Primary Examiner—Robert W. Jenkins
Attorney, Agent, or Firm—Wood, Herron & Evans

[57] ABSTRACT

An improved coffee or tea brewer having mounted within a casing a cold water tank and infusing arrangement with a water heater connected between the two and mounted under the tank, the heater having a cover for cleaning the water fed interior of the heater, the cover opening rearwardly and shielded from electrical components by a shield so that only the rear of the heater can be accessed from a rear access opening in the closing; the heater cover preferably has the heater inlet and outlet mounted thereon so that the heater can be more effectively cleaned.

3 Claims, 3 Drawing Figures

COFFEE AND TEA MAKING OR BREWING APPARATUS

This invention relates to coffee and tea making or brewing apparatus and especially to apparatus of the type which heats or boils water.

In such a brewer the water may be heated in a separate enclosed heater. Due to the compact construction of such brewers the heater is of necessity somewhat tucked away into the back of the brewer. After a certain period of use particularly when using water with a high chalk content it is necessary to clean the heater to remove scale which adheres to parts of the heater. For various reasons descaling compounds are not favoured and therefore scale has to be removed by washing and scrubbing. Since such brewers contain a number of electrical components it has been the practice to enclose the heater within a back plate which can only be removed by using tools and thus the descaling operation should only be carried out by skilled maintenance staff.

It is an object of the present invention to reduce the requirement for expert maintenance and to facilitate descaling the heater of such brewers.

Coffee or tea making or brewing apparatus in accordance with this invention has a water heater with an electrical heating element the heater having an inlet connected to a conduit from a source of, or reservoir for cold or unheated water and an outlet, the heater having a manually removable cover, accessible through an access opening in the heater casing wherein a shield is provided to shield the interior of the access opening from the electrical heater element electrical connections.

Thus an unskilled operator can safely have access through the access opening for example to remove the heater cover for removal to a sink for washing.

It has been found that in such a heater there is a tendency for scale to build up in the area of the outlet.

To deal with this the inlet and outlet to the heater are preferably provided in the cover. This enables the cover to be removed from the brewer and the inlet and outlets to be thoroughly washed.

Preferably the cover is secured to the heater by means of a central wing nut. In order to drain the heater prior to removal of the cover a drain cock or stop may be provided at the bottom of the heater. The conduits from the inlet and outlet at the connection with these are preferably flexible and slip onto the inlet or outlet.

Figure 2:
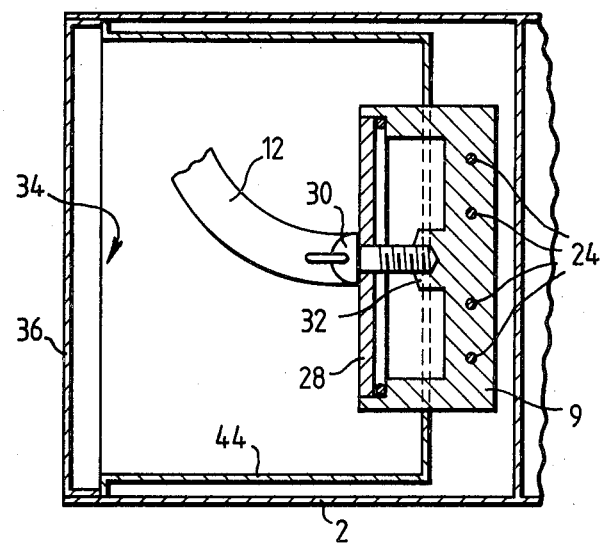
Figure 3:
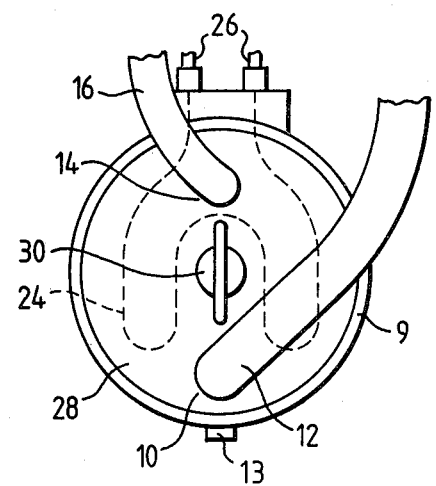

The invention will now be further described by way of example with reference to the accompanying drawings in which:

FIG. 1 is a schematic side elevation of a coffee making apparatus in accordance with the invention, FIG. 2 is a downward view of the heater and associated casing for the apparatus of FIG. 1 taken as a cross section at B—B, and FIG. 3 is a view of the heater of FIG. 2 taken in the direction of arrow A.

Referring to FIG. 1 the coffee making apparatus comprises a casing or body 2 having an internal cold water tank or reservoir 4 positioned at its top and having an inlet 6 through the top of the casing 2 to receive cold water from a flask, which inlet may be closed by cover 8.

The cold water tank 4 is connected to an inlet 10 of a heater 9 by means of a flexible pipe or conduit 12. The heated water flows from the heater through an outlet 14 to a flexible pipe or conduit 16 which passes up adjacent the cold water tank 4 and connects with a spray head 18 positioned above the coffee infuser basket 20. At the back of the heater 9 is an electrical heating element 24 with electrical leads 26 extending from the top of the heater and connected to further electrical elements (not shown). Switches 27 for the apparatus are mounted at the front of the apparatus. The heater 9 is covered with a circular cover plate 28 in which the inlet 10 and outlet 14 are mounted. The cover 28 is secured to the heater by means of a wing nut 30 which screws into a central boss 32 into the heater.

Access to the heater cover is by means of an access opening 34 at the rear of the apparatus casing 2 and the access opening is covered by a cover plate 36 which is retained in the casing at its top by means of a lip portion 38 and at the bottom by means of a bracket 40 which engages over a retaining member 42. Removal of the cover 36 is by lifting the cover so that bracket 40 disengages with member 42 and by lifting the bottom of the cover 36 away from casing 2 and allowing top of the cover to drop out of retention by lip 38.

The heater 9 is provided with a drain cock 13 which screws into a hole 15 in the bottom of the heater and which is preferably opened to drain the heater of any water before taking the heater cover 28 off the heater.

The rear of the heater including the electrical connections 26 is shielded from the opening 34 by means of a shield plate 44 which extends upwardly from the bottom of the casing 2 around the heater 9 and then horizontally under the tank 4 of the upper side of the opening 34 at 46. The shield may be further extended from point 46 upwardly to the top of the casing 2 adjacent lip 38.

The embodiment of the invention allows for easy do-it-yourself descaling, without resorting to using tools to open the water heater, by simple unclipping of the back cover 36 and by easy access to the heater 9 covered by cover plate 28 secured by a wing nut 30. The electrical parts are shielded at the rear by the shield 44 so that the descaling operation is rendered safe without danger of touching live parts of the electrical heating element or other controls or wires inside the machine. The cover 28 of the heater can be easily slipped off from the flexible conduits 12 and 16 for thorough washing in a sink.

We claim:

1. Apparatus for brewing or making coffee or tea comprising an exterior casing,
    an internal cold water tank mounted within and at the top of the casing,
    an inlet in the top of said casing communicating with said tank to replenish said tank with water,
    an infuser basket mounted to and forwardly of said casing above a dispensing position,
    an electrical heater with a heater element therein mounted in said casing below said tank,
    said heater provided with a rearwardly opening cover and electrical element leads extending from a forward portion of the heater body,
    a cold water-inlet connected to said tank,
    a hot water outlet connected to a spray head above said basket,
    a shield interposed between said cover and said leads and other electrical components of said apparatus, and
    a rearwardly opening rear plate to said casing which when open enables easy access to said heater cover.

2. Apparatus as claimed in claim 1 wherein said water inlet and outlet are provided in said cover,
and wherein flexible conduits extend from said inlet and outlet to said tank and spray head respectively.

3. Apparatus as claimed in claim 1 wherein said heater is provided with a drain cock whereby water in the heater can be drained down prior to opening the cover.

* * * * *